Patented Oct. 9, 1923.

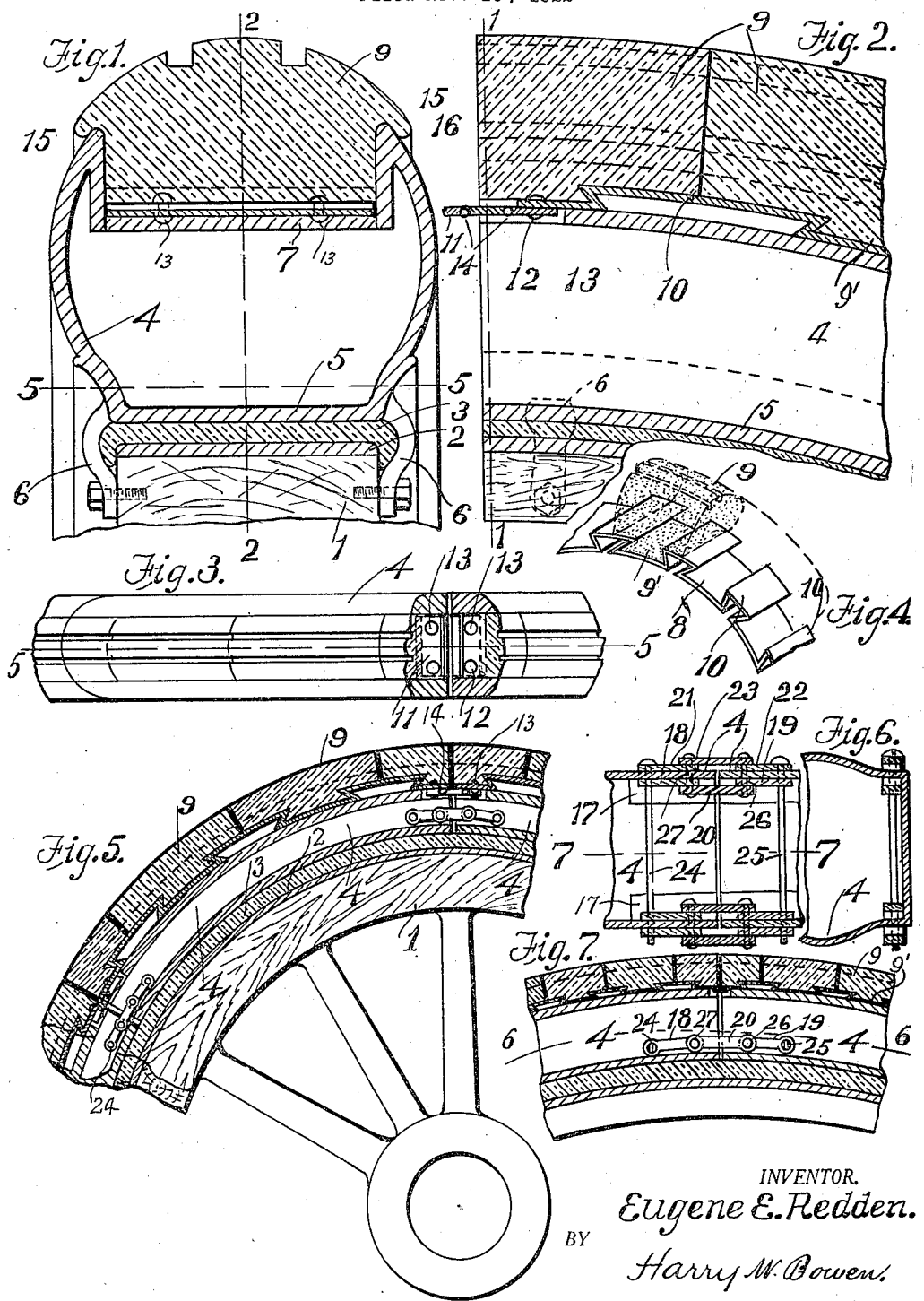

1,470,105

UNITED STATES PATENT OFFICE.

EUGENE E. REDDEN, OF SPRINGFIELD, MASSACHUSETTS.

TIRE.

Application filed November 10, 1922. Serial No. 600,036.

*To all whom it may concern:*

Be it known that I, EUGENE E. REDDEN, a citizen of the United States of America, residing at Springfield, county of Hampden, and Commonwealth of Massachusetts, have invented certain new and useful Improvements in Tires, of which the following is a specification.

This invention relates to improvements in resilient tires for use on motor vehicles for the purpose of taking the place of the ordinary pneumatic tire but at the same time having the appearance of the pneumatic tire.

Broadly the invention comprises a plurality of arc-shaped metallic tubular members, or sections, that are suitably secured together and attached to the wheel. The outside appearance of these sections being similar to the usual pneumatic tire.

The invention further comprises a plurality of flexible units or sections, that are attached to the metallic tubular sections or members and suitable detachable means for securing these sections together. The periphery or outer circumference of the tread portions of the metallic sections is formed with a groove or channel in which are located or placed the flexible units having sections of rubber or other suitable resilient material secured thereto to form the tread of the wheel.

An object, therefore, is to provide a puncture proof tire having the appearance of a pneumatic tire and in which sections of rubber are used to produce the resilient or easy riding effect.

Referring to the drawings:

Fig. 1 is a transverse sectional view taken substantially on the line 1—1 of Fig. 2 showing the channel-shaped periphery of the metallic tire, the rubber tread portion of the tire; the means for securing the metallic tire to the wheel.

Fig. 2 is a sectional view on the line 2—2 of Fig. 1 showing the strip of folded metal, the folds being substantially zig-zag or dove tail in shape and portions of the rubber tread attached thereto.

Fig. 3 is a plan view of the tread portion of the tire illustrating the hinges for connecting the folded sections of metal together.

Fig. 4 is a detail view of the folded strip of metal having the zig-zag or dove tailed shaped channels and one of the blocks of rubber tread secured thereto.

Fig. 5 is a sectional view of one of the tubular sections showing the links for connecting the sections to each other also the tread portions of this section, on the line 5—5 of Fig. 3.

Fig. 6 is a sectional view on the line 6—6 of Fig. 7, and

Fig. 7 is a sectional view on the line 7—7 of Fig. 6.

Referring to the drawings in detail:

1 designates the wooden felloe or other part of the wheel, 2 the metal rim thereon, 3 a layer of rubber on the metal rim, 4 one of the tubular metallic sections of the tire of the wheel. This section is preferably 60° in extent so that six of them form a complete tire. Its bottom portion 5 rests upon the layer of rubber 3 as shown. It is attached to the wooden felloe of the wheel by means of the usual clips 6. The outer edges or periphery of the sections are formed with a depressed or channel shaped portion 7 and in this channel is placed the partially folded strips of dove tailed or zig-zag shaped metal members shown in Fig. 4. This strip provides the dove tailed or channel portions 8, the bottoms of which rest directly on the part 7 of the tubular sections 4 and in these channels or dove tailed shaped members are placed the blocks of rubber 9 which forms the tread one of which is shown in place by the dotted lines in Fig. 4. These blocks are assembled by slipping the dove tailed lower portions 9' into the grooves 8 and then the strips with the blocks 9 thereon are placed in the groove or channel 7, the adjacent blocks rest upon the portions 10 of the dove tailed shaped member. For the purpose of securing the sections of dove tailed shaped metallic strips together a double hinge, shown in Fig. 2, is provided the ends 11 and 12 of which are attached to the dove tailed shaped members by means of the rivets 13. The intermediate pivot pins being indicated at 14. It is of course obvious that the ends of these dove tailed sections are attached together by means of a pin passing through one of the hinges. This construction permits the flexible dove tailed sections to readily conform to the curved surface of the channel 7. The blocks of rubber 9 as shown in Fig. 1 overlap the edges 15, as indicated at 16, whereby the entrance of sand or water is prevented from gaining access to the channels 7. Each of the metallic tubular sections 4 are formed by drop forging and are made in one piece and these tubular sections are attached together by means of the link construction shown in Figs. 6 and 7. The sections are recessed at 17 in which are placed the links 18, 19, and 20 and the corresponding links 21, 22, and 23. The links 18 and 21 are connected together and to the sections 4 by means of the bolts 24 and the links 19 and 22 are connected together and to the adjacent section 4 by means of the bolt 25 while the links 20 and 23 are connected to the adjacent links and to the ends of the sections 4 by means of the rivets 26 and 27 as shown. By means of this construction the metallic tubular sections 4 will readily fit and adapt themselves to the curvature of the metal rim 2. It will readily be seen from this construction that the tire as a whole will be readily assembled. The sections 4 will first be put in place and attached to the rim, then the strips of folded metal shown in Fig. 4 having the blocks 9 thereon. When these strips and blocks are dropped into the channel 7 the last two are attached or secured together by the pivot pins 14.

It will be noticed that the tire is provided with a rubber cushion at 3 as well as a rubber tread at 9 whereby the shocks of the road are readily absorbed.

What I claim is:

1. A resilient tire comprising a plurality of tubular sections each section being formed with a channel which register with each other, resilient elements located in the channel, means formed with dove tailed shaped folds therein for receiving and securing the resilient elements in the channel, and means for attaching the tubular sections to the rim of the wheel.

2. A metallic tire formed of a plurality of tubular members, means for attaching the members together, a channel formed in their outer edges, a strip of metal formed with dove tailed shaped portions, blocks of resilient material located in the dove tailed portions and also located in the channels of the tire, means for securing the strips together and in the channel including hinges, and means for securing the sections to the wheel.

3. A resilient tire comprising a plurality of tubular members, each member having a channel shaped grooved portion therein, means for securing the tubular members together and to the wheel, strips of folded material located in the grooved portion of each member, blocks of resilient material attached to the folded strips, and means for attaching the folded strips to each other.

4. A tire construction comprising a plurality of tubular members, each having a channel portion therein, means for attaching the members to the rim of a wheel, means for connecting the same together including links, pins connecting the links to the adjacent ends of the members, resilient elements in the channel portions, each element having a dove tailed shaped inner end, sections of folded strips to receive the dove tailed shaped ends, and hinge devices for connecting the sections together and for retaining the folded strips in the channels as described.

5. A tire construction comprising a plurality of tubular members each having a channel portion to receive resilient elements which form the tread of the tire, and devices for detachably securing the resilient elements in the channel portions, said devices including a folded strip having interlocking portions with the resilient elements.

6. In a tire construction, the combination of a plurality of separably arc-shaped tubular members joined together end to end, devices for connecting the same together, devices for attaching the same to a wheel, resilient elements detachably connected to the tubular members for forming the tread portion proper, said elements being connected to the tubular members by means of a folded metal strip having grooves to receive projections on the resilient elements.

EUGENE E. REDDEN.